(12) United States Patent
Smetana et al.

(10) Patent No.: US 9,022,890 B2
(45) Date of Patent: May 5, 2015

(54) TRANSMISSION DEVICE, FOR EXAMPLE FOR AN ELECTRIC AXLE AND ELECTRIC AXLE COMPRISING THE TRANSMISSION DEVICE

(75) Inventors: Tomas Smetana, Herzogenaurach (DE); Philip Wurzberger, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 5 days.

(21) Appl. No.: 14/111,037

(22) PCT Filed: Mar. 12, 2012

(86) PCT No.: PCT/EP2012/054209
§ 371 (c)(1),
(2), (4) Date: Nov. 18, 2013

(87) PCT Pub. No.: WO2012/139831
PCT Pub. Date: Oct. 18, 2012

(65) Prior Publication Data
US 2014/0066247 A1    Mar. 6, 2014

(30) Foreign Application Priority Data

Apr. 13, 2011    (DE) .................. 10 2011 007 253

(51) Int. Cl.
*F16H 1/48* (2006.01)
*F16D 3/06* (2006.01)
*H02K 7/116* (2006.01)
*F16H 1/28* (2006.01)
*F16H 3/54* (2006.01)
*H02K 15/16* (2006.01)
*B60K 1/00* (2006.01)

(52) U.S. Cl.
CPC .. *F16H 1/48* (2013.01); *F16D 3/06* (2013.01); *F16H 1/2845* (2013.01); *F16H 3/54* (2013.01); *F16H 2200/0021* (2013.01); *F16H 2200/0034* (2013.01); *F16H 2200/2005* (2013.01); *H02K 7/116* (2013.01); *H02K 15/16* (2013.01); *H02K 2213/09* (2013.01); *B60K 2001/001* (2013.01)

(58) Field of Classification Search
CPC ..... F16H 1/32; F16H 2001/322; F16H 57/08; B60K 17/046
See application file for complete search history.

(56) References Cited

U.S. PATENT DOCUMENTS 7,383,748 B2 * 6/2008 Rankin ........................ 74/325
7,762,366 B2 * 7/2010 Janson ...................... 180/65.6

FOREIGN PATENT DOCUMENTS

| EP | 587389 | 3/1994 |
| JP | 8 048 164 | 2/1996 |
| KR | 2009 00 44 805 | 5/2009 |

* cited by examiner

*Primary Examiner* — Robert A Siconolfi
*Assistant Examiner* — Huan Le
(74) *Attorney, Agent, or Firm* — Davidson, Davidson & Kappel, LLC

(57) ABSTRACT

A transmission device or an electric axle which has improved operational characteristics compared to known solutions. Said aim is achieved by providing a transmission device (1) including an electric motor (3) provided with a rotor (6), a planetary gear (4) provided with at least one sun gear (9), and a shaft arrangement (7,8), the rotor (6) being coupled in a rotationally fixed manner to the sun gear (9) by the shaft arrangement (7, 8). The shaft arrangement (7,8) includes at least one compensation interface (21) which is designed such that it is possible to change the distance and/or tilting between the motor (6) and sun wheel (9).

20 Claims, 2 Drawing Sheets

TRANSMISSION DEVICE, FOR EXAMPLE FOR AN ELECTRIC AXLE AND ELECTRIC AXLE COMPRISING THE TRANSMISSION DEVICE

The present invention relates to a transmission device having an electric motor which has a rotor, a planetary gear which has at least one sun wheel, and a shaft system, the rotor being coupled to the sun wheel in a rotationally fixed manner via the shaft system. Moreover, the present invention relates to an electric axle for a vehicle having this transmission device.

BACKGROUND

Transmission devices which transmit drive torques, for example, from an electric motor to an output and optionally step down or step up gearings are widely known. Due to the focus of the automotive industry on electric drives, these types of transmission devices as part of the drive concept have attracted interest for on-road vehicles. In these drive concepts, the electric motor generates the drive torque or a superimposed torque and delivers same via a rotor. The transmission to an output then often occurs via a planetary gear, which in the customary design has a sun wheel, it being known to couple the rotor directly to the sun wheel in order to conduct the drive torque from the electric motor into the planetary gear.

For example, the publication EP 587389, which is presumed to constitute the most proximate related art, discloses a differential gear having a support element between the output shafts. As is apparent in particular from the figures, the differential gear includes a centrally situated electric motor which delivers its drive torque via a rotor. The rotor is coupled in a rotationally fixed and nondisplaceable manner to a sun shaft, which in turn is connected in a rotationally fixed manner to a sun wheel, so that the drive torque flows from the electric motor, via the rotor and the sun shaft, to the sun wheel and is conducted into the planetary gear.

SUMMARY OF THE INVENTION

It is an object of the present invention to provide a transmission device or an electric axle which has improved operating characteristics compared to the known approaches.

The present invention provides a transmission device which includes at least one electric motor and at least one planetary gear. The transmission device may in particular be designed as an electric axle, i.e., as a module which distributes the drive torque of the electric motor to the wheels of a vehicle. Alternatively or additionally, the transmission device may be designed as a superposition gear which superimposes the drive torques of two motors which are different or of two motors which are the same, and then provides same to an output. The transmission device is suited and/or designed in particular for providing the drive torque for an on-road vehicle.

The planetary gear is preferably designed as a spur planetary gear, and particularly preferably as a spur gear differential, which transmits the drive torque of the electric motor and optionally of an additional motor to two output shafts.

The planetary gear includes at least one sun wheel which is designed for introducing the drive torque from the electric motor into the planetary gear. The coupling between the sun wheel and the rotor is achieved by a shaft system, so that the rotor is coupled to the sun wheel in a rotationally fixed manner via the shaft system. In particular, the rotor and the sun wheel are situated coaxially with respect to the shaft system.

Within the scope of the present invention, it is proposed that the shaft system has at least one compensation interface which is designed to allow a change in distance between the rotor and the sun wheel. This type of distance tolerance between the rotor and the sun wheel may be utilized, for example, during assembly of the transmission device when the distance between the rotor and the sun wheel varies due to manufacturing tolerances.

However, the compensation interface may also afford advantages during operation, since the transmission of the drive torque and the meshing of the sun wheel in the planetary gear may result in distortions, which heretofore have been transmitted as axial forces from the sun wheel to the rotor via a shaft system. Due to the compensation interface, these types of axial forces are now no longer transmitted, since the compensation interface allows the distance between the rotor and the sun wheel to vary.

The advantages of the present invention are thus based on the separate torque flows and force flows within the transmission device. Only torques, in particular the drive torque, are conducted via the shaft system. In contrast, due to the compensation interface, axial forces which arise cannot be transmitted from the sun wheel to the rotor or in the opposite direction.

The compensation interface thus results in insensitivity to manufacturing and installation tolerances, relieving the load on, and thus increasing the service life of, the rotor bearing of the electric motor, which often rotates at high speeds, since no axial forces are transmittable, improved efficiency due to reduction of friction and optionally a reduction of noise in the transmission device, and also a cost reduction, since extremely small manufacturing and installation tolerances are no longer necessary.

In one specific application of the present invention, the shaft system is designed to allow an axial displacement and/or an axial movement between the rotor and the sun wheel in such a way that axial forces cannot be transmitted between the rotor and the sun wheel, or can be transmitted only in damped form. An axial displacement or movement may also be brought about due to tilting or twisting of the rotor and/or the sun wheel.

According to this subject matter, the shaft system includes a rotor shaft and a sun shaft which are coupled to one another in a rotationally fixed manner via a, or the, compensation interface, the rotor shaft and the sun shaft being designed so that they are moving, movable, and/or displaceable relative to one another in the compensation interface.

In this embodiment, the present invention is directed to one possible design variant, the compensation interface being designed as a mechanical interface between the rotor shaft and the sun shaft. However, the present invention is not limited to the most general form, since a compensation interface of this type could alternatively or additionally be situated between the sun shaft and the sun wheel or between the rotor shaft and the rotor.

As a result of the preferred specific embodiment according to claim 3, the rotor shaft and the sun shaft are not twistable in the axial direction and/or are situated with play relative to one another, and in this way achieve the axial decoupling of the rotor and the sun wheel via the shaft system.

In possible design embodiments of the present invention, it is provided that the rotor shaft and the sun shaft are situated so that they are axially displaceable with respect to one another, preferably in a telescoping manner, in the axial direction in the compensation interface by more than 1 mm, preferably by more than 3 mm, and in particular by more than 5 mm. This displacement or compensation path is sufficient to compensate for the manufacturing- or installation-related tolerances as well as the load-related changes in position between the rotor and the sun wheel.

In one particularly preferred embodiment of the present invention, the sun shaft is coupled to the sun wheel in a rotationally fixed and nondisplaceable manner. In this embodiment, the sun shaft and the sun wheel are designed as one piece and form an assembly which is easy to install.

It is further preferred that the rotor shaft and/or the rotor is/are accommodated in a bearing in a nondisplaceable manner with respect to a housing of the transmission device and/or of the electric motor, and/or with axial pretensioning. Possible tolerances between the sun wheel and the rotor shaft or rotor may be compensated for via the compensation interface.

It is particularly preferred when the bearing of the rotor shaft or of the rotor has at least two bearing devices which are designed as ball bearings, for example, and which are situated at a distance from one another in an O configuration or an X configuration. The design as an O configuration may be used in a particularly advantageous manner and is particularly preferred, since it is ensured that no axial forces may be introduced into the bearing device via the shaft system or the rotor shaft.

In one possible design embodiment of the present invention, the sun wheel has a spline in order to mesh with planet wheels of the planetary gear. On the one hand this spline is particularly advantageous for transmitting or introducing the drive torques, but on the other hand a spline of this type, in particular when it is designed as helical gearing, usually results in distortion of the sun wheel. However, due to the newly provided compensation interface, this distortion is not transmitted to the rotor or the rotor shaft, so that these problems with the spline are remedied by the compensation interface.

In one particularly preferred design implementation of the present invention, the compensation interface is based on a form-locked, preferably telescope-like, connection which is designed for transmitting torques, in particular as a plug-in gearing, a spline, and/or a polygonal gearing.

The compensation interface is particularly preferably situated between the two bearing devices, viewed axially, and/or in overlap with the electric motor and/or the rotor, at least in the radial direction.

Due to the asymmetrical positioning and displacement of the compensation interface in the direction of the electric motor or the rotor shaft, the sun shaft is designed as an elongated component, and has a sleeve section which particularly preferably is implemented in a thin-walled design, so that, in addition to the axial degree of freedom in the compensation interface due to the elasticity of the sun shaft, a radial compensation for misalignments between the electric motor and the planetary gear may also result. The sun shaft is particularly preferably provided between the sun wheel and the compensation interface in an unsupported and/or bearingless and/or suspended manner.

In one preferred design embodiment of the present invention, the sun wheel is supported in the axial direction on a, or the, housing of the transmission device and/or of the electric motor via moving or stationary components. Due to the support, the axial forces, which can no longer be conducted via the shaft system, are now conducted into the housing via a different force path. The axial support takes place, for example, by inserting an axial rolling bearing which is supported in the axial direction on areas which are or may be fixed to the housing. In some specific embodiments, the sun wheel may be supported on a moving component, for example an annulus wheel, in the axial direction via a first rolling bearing, and via the axial rolling bearing may then be supported on the area which is or may be fixed to the housing.

The further subject matter of the present invention relates to an electric axle for a vehicle, which according to the present invention has a transmission device according to one of the preceding claims or as described above.

BRIEF DESCRIPTION OF THE DRAWINGS

Further features, advantages, and effects of the present invention result from the following description of one preferred exemplary embodiment of the present invention.

DETAILED DESCRIPTION

Figure 1:
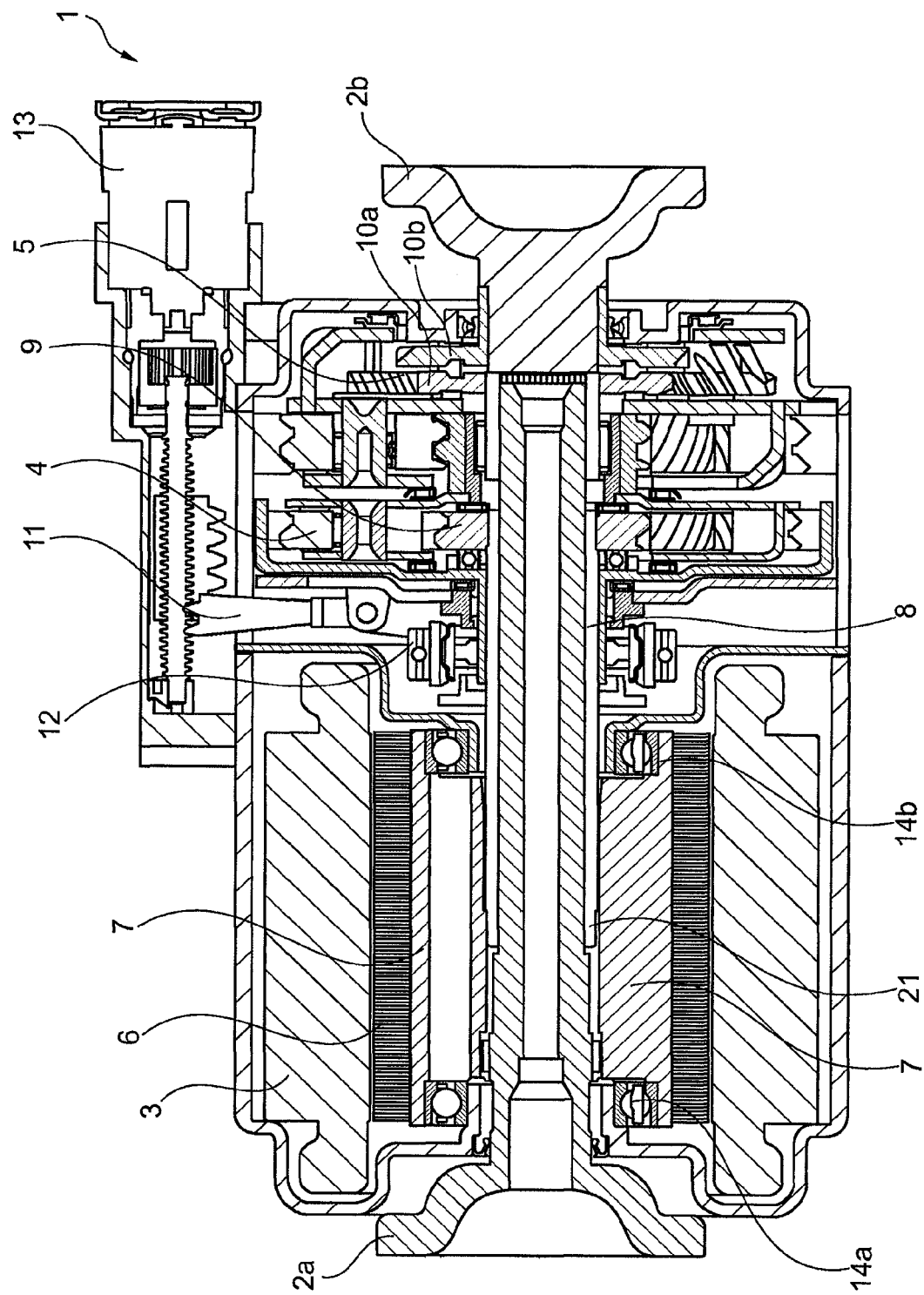
FIG. 1 shows a schematic longitudinal section of an electric axle as a first exemplary embodiment of the present invention.

FIG. 1 shows a schematic longitudinal sectional illustration of an electric axle 1 as one exemplary embodiment of the present invention. Electric axle 1 includes two outputs 2a, 2b, designed as full floating axles, which relay a drive torque which is generated by an electric motor 3 to the wheels of a vehicle. In addition, electric axle 1 includes a planetary gear 4 which brings about a conversion, in particular a step-up or step-down, of the drive torque which is generated by electric motor 3, and conducts the drive torque to outputs 2a, 2b via a differential section 5. Electric motor 3, outputs 2a, 2b, planetary gear 4, and differential section 5 are situated coaxially with respect to one another, so that electric axle 1 is designed as a very compact module.

Starting from electric motor 3, the drive torque is transmitted via a rotor 6 to a rotor shaft 7, which is coupled to a sun shaft 8 in a rotationally fixed manner. Sun shaft 8 conducts the drive torque to a first sun wheel 9 which meshes with planet wheels in planetary gear 4. The drive torque is conducted via planetary gear 4 to differential section 5, which transmits the converted drive torque to outputs 2a, 2b via a second and a third sun wheel 10a, 10b, respectively. It is emphasized in particular that rotor shaft 7, sun shaft 8, and first sun wheel 9 are situated coaxially and/or concentrically with respect to one another. For the sake of completeness, it is noted that planetary gear 4 is designed as a two-speed gear which may be switched between two conversion states via a shift fork 11 and an engagement bearing 12. The switchover is carried out via an actuator motor 13.

Figure 2:
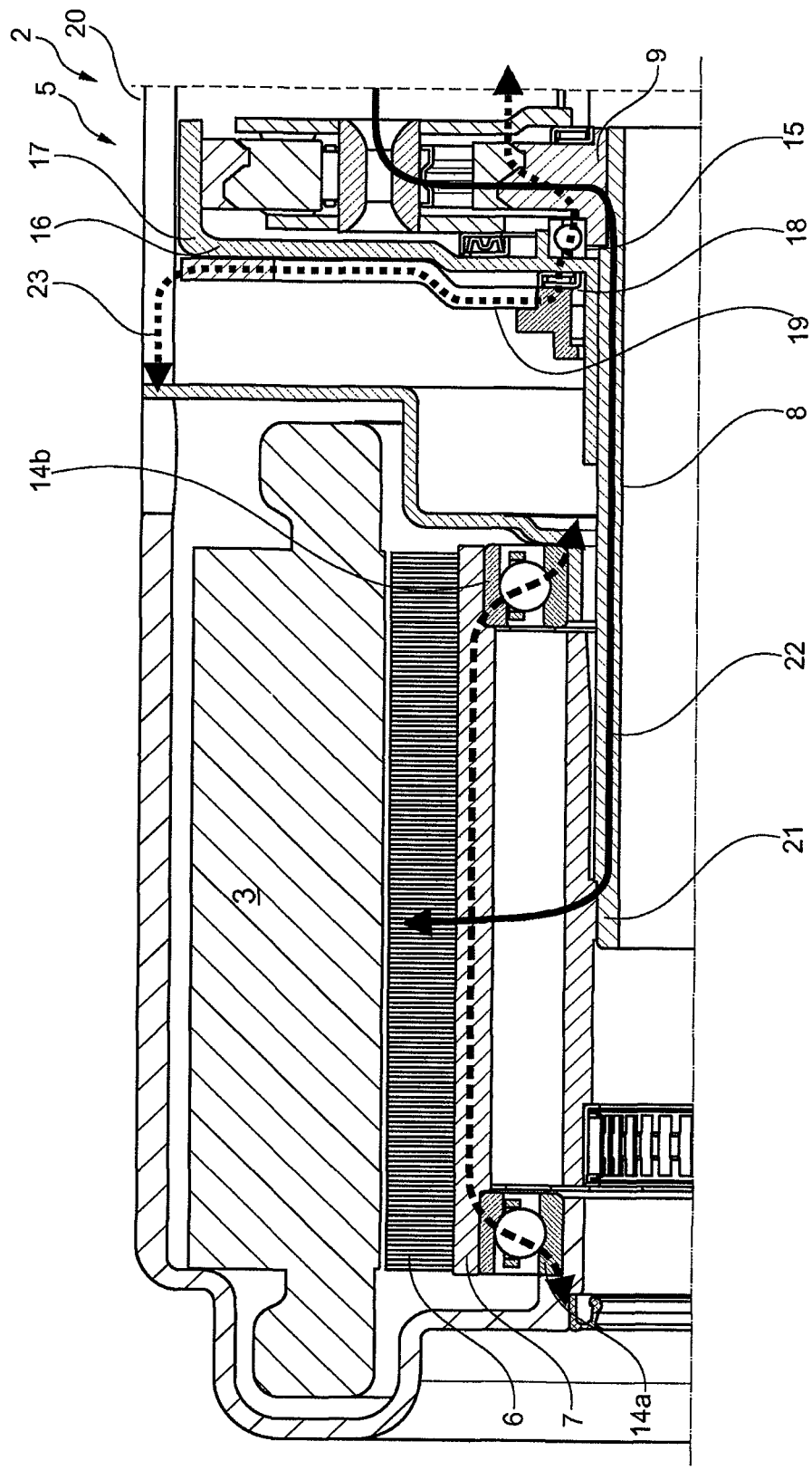
FIG. 2 shows an enlarged detail from FIG. 1 for illustrating the torque flows and axial force flows.

For a more accurate description, reference is made to FIG. 2, which shows electric axle 1 in the same view but in enlarged detail, and also with some components graphically omitted. Identical parts are denoted by the same reference numerals in FIG. 2.

Rotor shaft 7 is supported via a bearing which includes two bearing devices 14a, 14b. Bearing devices 14a, 14b are designed as two pretensioned angular ball bearings in an O configuration, so that rotor shaft 7 is supported without play. Rotor shaft 7 is situated on the outer rings of bearing devices 14a, 14b, whereas the inner rings are fixedly mounted on the housing.

First sun wheel 9 is supported via a ball bearing 15 against a support wall 16 of an annulus wheel 17 of planetary gear 4. Annulus wheel 17 or support wall 16 is supported via an axial needle bearing 18 on a support 19, which is fixedly connected in all directions to gear housing 20 of electric axle 1.

In addition, first sun wheel 9 is seated on sun shaft 8 in a rotationally fixed connection. Possible specific embodiments of the sun wheel 9/sun shaft 8 assembly involve one-piece variants, welding sun wheel 9 and sun shaft 8 together, or a press fit between these parts. Sun shaft 8 has a sleeve section 5 which extends, beginning at planetary gear 4, to beneath electric motor 3, in particular to the middle of electric motor 3. Since sun shaft 8 must accommodate outputs 2a, 2b as full floating axles, the sleeve section has a thin-walled design.

A compensation interface 21 via which sun shaft 8 is coupled to rotor shaft 7 in a rotationally fixed manner is situated in the axial area of electric motor 3 and/or centrally with respect to electric motor 3 or to rotor shaft 7, viewed axially. Compensation interface 21 implements a form-locked connection, for example a plug-in gearing, a spline or a polygonal gearing.

A torque flow may thus occur from electric motor 3 via rotor shaft 7, compensation interface 21, sun shaft 8, and first sun wheel 9 according to arrow 22.

It is emphasized in particular that sun shaft 8 and rotor shaft 7 are situated in compensation interface 21 so that they are axially displaceable with respect to one another. The axial displaceability has the technical effect that no axial forces can be transmitted between rotor 6 and first sun wheel 9 via the shaft system formed by sun shaft 8 and rotor shaft 7. Instead, axial forces of this type are transmitted from first sun wheel 9 to housing 20 via ball bearing 15, support wall 16, and axial needle bearing 18 according to arrow 23. Thus, only torques are conducted via the form-locked connection of rotor shaft 7 to sun shaft 8.

In addition, sun shaft 8, which is long and, due to the design, elastic, allows a radial compensation of misalignments between electric motor 3 and planetary gear 4 of electric axle 1. Axial forces possibly resulting from a helical gearing of planetary gear 4 are dissipated initially into annulus wheel 17 via ball bearing 15, and then through axial needle bearing 18 from support 19 into housing 20. Thus, aside from the operating pretension, bearing devices 14a, 14b experience no additional operating forces. In addition, first sun wheel 9 has a precise position with respect to annulus wheel 17 of planetary gear 4.

LIST OF REFERENCE NUMERALS

1 axle
2a, 2b full floating axles
3 electric motor
4 planetary gear
5 differential section
6 rotor
7 rotor shaft
8 sun shaft
9 first sun wheel
10a, 10b second and third sun wheel
11 shift fork
12 engagement bearing
13 actuator motor
14a, 14b bearing devices
15 ball bearing
16 support wall
17 annulus wheel
18 axial needle bearing
19 support
20 housing
21 compensation interface
22 arrow
23 arrow

What is claimed is:

1. A transmission device comprising:
   an electric motor having a rotor;
   a planetary gear, the planetary gear having at least one sun wheel; and
   a shaft system, the rotor being coupled to the sun wheel in a rotationally fixed manner via the shaft system, the shaft system having at least one compensation interface designed to allow a change in distance or tilting between the rotor and the sun wheel, wherein the shaft system includes a rotor shaft and a sun shaft coupled to one another in a rotationally fixed manner via the compensation interface, the rotor shaft and the sun shaft being designed to be axially moving, movable, or displaceable relative to one another in the compensation interface.

2. The transmission device as recited in claim 1 wherein the shaft system is designed to allow an axial displacement, tilting, or axial movement between the rotor and the sun wheel in such a way that axial forces cannot be transmitted between the rotor and the sun wheel, or can be transmitted only in damped form.

3. The transmission device as recited in claim 1 wherein the sun shaft is coupled to the sun wheel in a rotationally fixed and nondisplaceable manner.

4. The transmission device as recited in claim 1 further comprising a first bearing and a second bearing, the compensation interface is situated in an axial area between the first bearing and the second bearing, or in overlap with the electric motor in the radial direction.

5. The transmission device as recited in claim 1 wherein the shaft system includes a sun shaft, the sun shaft having a sleeve section elastically deformable or deflectable in the radial direction in order to compensate for misalignments between the rotor and the sun wheel.

6. The transmission device as recited in claim 1 wherein the sun wheel is supported in the axial direction on a housing via moving or via stationary components.

7. The transmission device as recited in claim 1 wherein the sun wheel is supported in the axial direction via at least one rolling bearing.

8. An electric axle or hybrid gear for a vehicle comprising the transmission device as recited in claim 1.

9. The transmission device as recited in claim 1 wherein the rotor shaft and the sun shaft are axially displaceable with respect to one another in the axial direction in the compensation interface by a distance of more than 1 mm.

10. The transmission device as recited in claim 9 wherein the distance is more than 3 mm.

11. The transmission device as recited in claim 10 wherein the distance is more than 5 mm.

12. The transmission device as recited in claim 1 wherein a rotor shaft of the shaft system or the rotor is accommodated in a bearing in a nondisplaceable manner with respect to a housing of the transmission device, or with axial pretensioning.

13. The transmission device as recited in claim 12 wherein the bearing has at least two bearing devices situated at a distance from one another in an O configuration or in an X configuration.

14. A transmission device comprising:
    an electric motor having a rotor;
    a planetary gear, the planetary gear having at least one sun wheel; and
    a shaft system, the rotor being coupled to the sun wheel in a rotationally fixed manner via the shaft system, the shaft system having at least one compensation interface designed to allow a change in distance or tilting between the rotor and the sun wheel, wherein a rotor shaft of the shaft system or the rotor is accommodated in a bearing in a nondisplaceable manner with respect to a housing of the transmission device, or with axial pretensioning, wherein the bearing has at least two bearing devices situated at a distance from one another in an O configuration or in an X configuration.

15. The transmission device as recited in claim 14 wherein the sun wheel is supported in the axial direction via at least one rolling bearing.

16. An electric axle or hybrid gear for a vehicle comprising the transmission device as recited in claim 14.

17. A transmission device comprising:

an electric motor having a rotor;

a planetary gear, the planetary gear having at least one sun wheel; and a shaft system, the rotor being coupled to the sun wheel in a rotationally fixed manner via the shaft system, the shaft system having at least one compensation interface designed to allow a change in distance or tilting between the rotor and the sun wheel, wherein the sun wheel is supported in the axial direction via at least one rolling bearing.

18. An electric axle or hybrid gear for a vehicle comprising the transmission device as recited in claim 17.

19. The transmission device as recited in claim 17 wherein a rotor shaft of the shaft system or the rotor is accommodated in a bearing in a nondisplaceable manner with respect to a housing of the transmission device, or with axial pretensioning.

20. The transmission device as recited in claim 19 wherein the bearing has at least two bearing devices situated at a distance from one another in an O configuration or in an X configuration.

* * * * *